(12) United States Patent
Boesch et al.

(10) Patent No.: US 12,455,567 B2
(45) Date of Patent: Oct. 28, 2025

(54) AUGMENTED REALITY FOR TELEOPERATION

(71) Applicant: Ford Global Technologies, LLC, Dearborn, MI (US)

(72) Inventors: Mathew Alan Boesch, Plymouth, MI (US); Levasseur Tellis, Southfield, MI (US); Anthony Mario D'Amato, Canton, MI (US)

( * ) Notice: Subject to any disclaimer, the term of this patent is extended or adjusted under 35 U.S.C. 154(b) by 269 days.

(21) Appl. No.: 18/333,533

(22) Filed: Jun. 12, 2023

(65) Prior Publication Data
US 2024/0411306 A1    Dec. 12, 2024

(51) Int. Cl.
G05D 1/00    (2024.01)

(52) U.S. Cl.
CPC ......... G05D 1/0044 (2013.01); G05D 1/0038 (2013.01)

(58) Field of Classification Search
None
See application file for complete search history.

(56) References Cited

U.S. PATENT DOCUMENTS

| | | | | |
|---|---|---|---|---|
| 2013/0253767 A1* | 9/2013 | Lee | ................ | B60W 50/04 701/41 |
| 2016/0375768 A1* | 12/2016 | Konet | ................ | B60K 35/10 348/148 |
| 2018/0257643 A1 | 9/2018 | Kroop et al. | | |
| 2019/0019335 A1* | 1/2019 | Elangovan | ............ | G06T 19/006 |
| 2019/0196464 A1 | 6/2019 | Lockwood et al. | | |
| 2019/0210598 A1* | 7/2019 | Endo | ................ | B62D 15/0285 |
| 2020/0064464 A1* | 2/2020 | Hiromitsu | ......... | B60W 30/0953 |
| 2020/0184809 A1* | 6/2020 | Lee | ................ | G08G 1/096861 |
| 2020/0192352 A1* | 6/2020 | Rastoll | ................ | G06V 20/58 |
| 2020/0324761 A1 | 10/2020 | Magzimof et al. | | |
| 2020/0353925 A1* | 11/2020 | Kim | ................ | B60W 40/08 |
| 2021/0064059 A1 | 3/2021 | Panigrahi et al. | | |
| 2021/0142678 A1 | 5/2021 | Chang et al. | | |
| 2021/0197813 A1* | 7/2021 | Houston | ............ | B60W 30/143 |
| 2023/0236037 A1* | 7/2023 | Heilbron | .......... | G08G 1/096758 701/422 |
| 2024/0098226 A1* | 3/2024 | Djukic | ................ | G05D 1/0016 |

OTHER PUBLICATIONS

Gaetano Graf, et al., Improving the Prediction Accuracy of Predictive Displays for Teleoperated Autonomous Vehicles, 20220 6th International Conference on Control, Automation and Robotics, Apr. 20-23, 2020, pp. 440-445.

Amin Hosseini, et al., Predictive Safety Based on Track-Before-Detect for Teleoperated Driving Through Communication Time Delay, 2016 IEEE Intelligent Vehicles Symposium, Jun. 19-22, 2016, pp. 165-172.

* cited by examiner

*Primary Examiner* — Daniel L Greene
*Assistant Examiner* — Robert L Pinkerton
(74) *Attorney, Agent, or Firm* — Emily Drake; Eversheds Sutherland (US) LLP

(57) ABSTRACT

A method to manage a vehicle is disclosed. The method may include obtaining vehicle inputs that may include an image captured by a vehicle camera. The method may further include estimating a time delay in teleoperation communication with the vehicle, and generating an augmented reality image based on the time delay and the vehicle inputs. The method may further include rendering the augmented reality image on a user interface to manage the vehicle.

18 Claims, 4 Drawing Sheets

AUGMENTED REALITY FOR TELEOPERATION

FIELD

The present disclosure relates to a system and method for operating a vehicle using teleoperation commands, and more particularly to a system and method for facilitating vehicle teleoperation using augmented reality.

BACKGROUND

Teleoperation is an act of operating a vehicle (or a robot) from a distance via a wireless connection, without being within a direct line of sight of the vehicle. In teleoperation, an operator views a first person view (FPV) presented on a viewing screen or a headset. The viewing screen displays an image of vehicle direction of travel, thereby providing situational awareness of vehicle motion to the operator. The operator may provide teleoperation commands to the vehicle using remote steering wheels, pedals, and other driving controls to manage or operate the vehicle, based on the image displayed on the viewing screen.

Typically, teleoperation efficiency depends upon strength or quality of communication link between the vehicle and a distant operator terminal that control the vehicle motion. In some scenarios, a time lag in the communication link may exist between the vehicle and the distant operator terminal. Due to the time lag, the image that is displayed on the viewing screen of the operator terminal may be out of sync with current vehicle reality, which may be undesirable.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a system and method to manage a vehicle. In particular, the present disclosure describes a system and method to tele-operate a vehicle using augmented reality. In some aspects, the system may estimate a time delay in communicating with the vehicle and may generate an augmented reality image based on the time delay. Specifically, the system may obtain image(s) from the vehicle in real-time and overlay additional information on the obtained image to generate the augmented reality image, which may facilitate a remote operator to effectively manage or control vehicle movement.

In some aspects, the system may determine a first predicted vehicle path based on a vehicle steering wheel position/angle, and a stopping distance range in proximity to a vehicle front portion based on vehicle speed, vehicle rate of change of speed, road slope, and the estimated time delay. The system may overlay the first predicted vehicle path and the stopping distance range on the obtained image to generate the augmented reality image.

In further aspects, the system may determine a second predicted vehicle path based on remote operator steering wheel position/angle, and overlay the second predicted vehicle path on the image obtained from the vehicle to generate the augmented reality image. The second predicted vehicle path may provide a real-time indication of predicted vehicle path to the remote operator based on remote operator inputs.

In addition, the system may be configured to determine a target object position for a target object on the image for a vehicle operator to focus and manage the vehicle. Specifically, the system may determine the target object position based on the vehicle speed, the vehicle rate of change of speed, the operator terminal steering wheel angle, and the time delay. The system may be configured to overlay the target object on the image to generate the augmented reality image.

The present disclosure discloses a system that facilitates coordination between the remote operator and the vehicle so that the remote operator may be aware of situation around the vehicle and may take appropriate control actions. Stated another way, the system may facilitate the remote operator to be aware of current vehicle reality even when there may be a time delay in communication with the vehicle. The system may further provide a sense of depth to the remote operator so that the remote operator may be aware of distance between the vehicle and an obstacle in the vehicle front portion.

ILLUSTRATIVE EMBODIMENTS

The disclosure will be described more fully hereinafter with reference to the accompanying drawings, in which example embodiments of the disclosure are shown, and not intended to be limiting.

Figure 1:
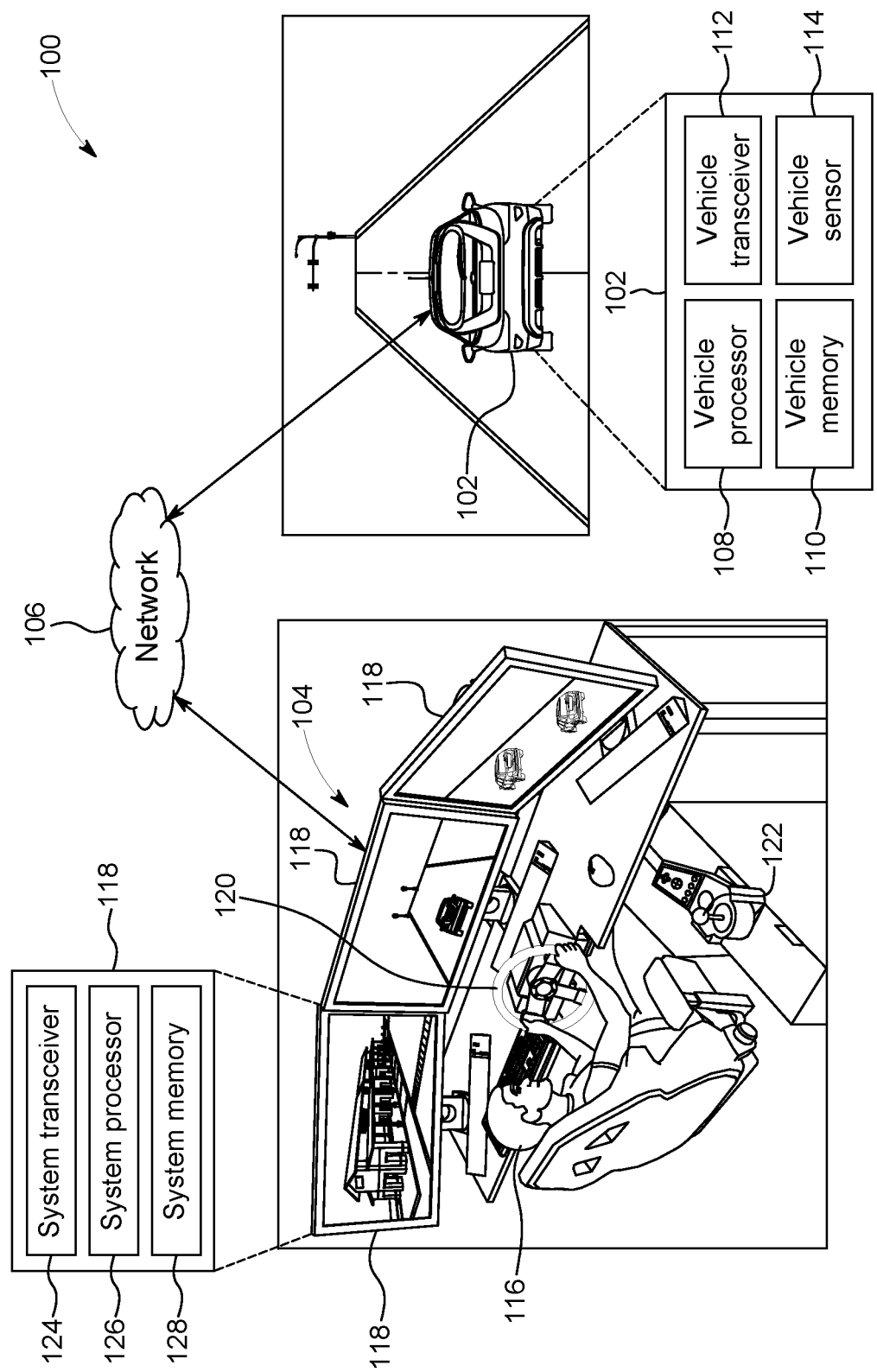
FIG. 1 depicts an example environment in which techniques and structures for providing the systems and methods disclosed herein may be implemented.

FIG. 1 depicts an example environment 100 in which techniques and structures for providing the systems and methods disclosed herein may be implemented. The environment 100 may include a vehicle 102. The vehicle 102 may take the form of any passenger or commercial vehicle such as, for example, an off-road vehicle, a car, a crossover vehicle, a van, a minivan, a bus, a truck, etc. Further, the vehicle 102 may be configured to operate in partially autonomous mode. Furthermore, the vehicle 102 may include any powertrain such as, for example, a gasoline engine, one or more electrically actuated motor(s), a hybrid system, etc.

The environment 100 may further include a remote teleoperation unit 104 that may be configured to manage or operate the vehicle 102 by using teleoperation commands via one or more networks 106. In some aspects, the remote teleoperation unit 104 may provide remote assistance to the vehicle 102 in response to receiving a request for assistance from the vehicle 102. The network(s) 106 illustrates an example communication infrastructure in which the connected devices discussed in various embodiments of this disclosure may communicate. The network(s) 106 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, one or more vehicle processor(s) 108, a vehicle memory 110, a vehicle transceiver 112, and one or more vehicle sensors 114, which may be communicatively coupled with each other. The vehicle processor 108 that may include any suitable processing unit capable of accepting digital data as input, processing the input data based on stored computer-executable instructions, and generating output data. The computer-executable instructions may be stored, for example, in data storage and may include, among other things, operating system software and application software. The computer-executable instructions may be retrieved from the data storage and loaded into the vehicle memory 110 as needed for execution. The vehicle processor 108 may be configured to execute the computer-executable instructions to cause various operations to be performed. The vehicle processor 108 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The vehicle memory 110 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the vehicle memory 110 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The vehicle transceiver 112 may be configured to transmit vehicle data or information (e.g., real-time images, vehicle steering wheel position, vehicle speed, vehicle rate of change of speed, etc.) from the vehicle 102 to the remote teleoperation unit 104 via the network 106. In addition, the vehicle transceiver 112 may receive teleoperation commands from the remote teleoperation unit 104 via the network 106. The vehicle processor 108 may be configured to obtain the teleoperation commands from the vehicle transceiver 112 and may be configured to control vehicle operation and movement based on the obtained teleoperation commands.

The vehicle sensors 114 may include, for example, one or more of proximity sensors, a Radio Detection and Ranging (RADAR or "radar") sensor (configured for detection and localization of objects using radio waves), a Light Detecting and Ranging (LiDAR or "lidar") sensor, accelerometers, gyroscopes, obstacle detection sensors, object classification sensors, steering angle/position sensor such as steering rack position or pinion angle, wheel sensor (to detect steering wheel angle), wheel speed sensors, vehicle cameras (including vehicle front camera and vehicle rear camera), and/or the like.

The remote teleoperation unit 104 may be configured to manage or control operation and/or movement of the vehicle 102. The remote teleoperation unit 104 may be configured to simulate a vehicle cockpit so that a remote operator 116 may conveniently control the vehicle 102 remotely. The remote teleoperation unit 104 may include a plurality of units including, but not limited to, one or more computing devices 118 (having respective user interface or display screens), a remote steering wheel 120 (or operator terminal steering wheel), a remote gear shift lever 122, remote accelerator pedal and brake pedals (not shown), augmented reality headset (not shown), joystick (not shown), and/or the like. In some aspects, only joystick and/or a touch screen may be present in the remote teleoperation unit 104, with no steering wheel, remote accelerator pedal or brake pedals. The example view depicted in FIG. 1 should not be construed as limiting the present disclosure scope.

The computing device(s) 118 may be configured to display a view or an image similar to a view that the remote operator 116 may see when the remote operator 116 may be located at a driver sitting area in the vehicle 102, via respective user interface (or an augmented reality headset, not shown). Specifically, the remote teleoperation unit 104 may be configured to receive real-time images from the vehicle 102 (e.g., from vehicle cameras) of areas in proximity to the vehicle 102, and may display the real-time images on the user interface. The real-time images may be similar to the views that the remote operator 116 would have seen if the remote operator 116 would be located inside the vehicle 102 and located at the driver sitting area in the vehicle 102. The remote operator 116 may view the received real-time images on the user interface and may perform control actions using the remote teleoperation unit 104 to control or operate the vehicle 102 remotely (e.g., by transmitting tele-operating commands to the vehicle 102).

In some aspects, in addition to the user interface, the computing device(s) 118 may include a system transceiver 124, a system processor 126, and a system memory 128, which may be communicatively coupled with each other.

The system memory 128 may store programs in code and/or store data for performing various system operations in accordance with the present disclosure. Specifically, the system processor 126 may be configured and/or programmed to execute computer-executable instructions stored in the system memory 128 for performing various system functions in accordance with the present disclosure. Consequently, the system memory 128 may be used for storing code and/or data code and/or data for performing operations in accordance with the present disclosure.

Figure 2:
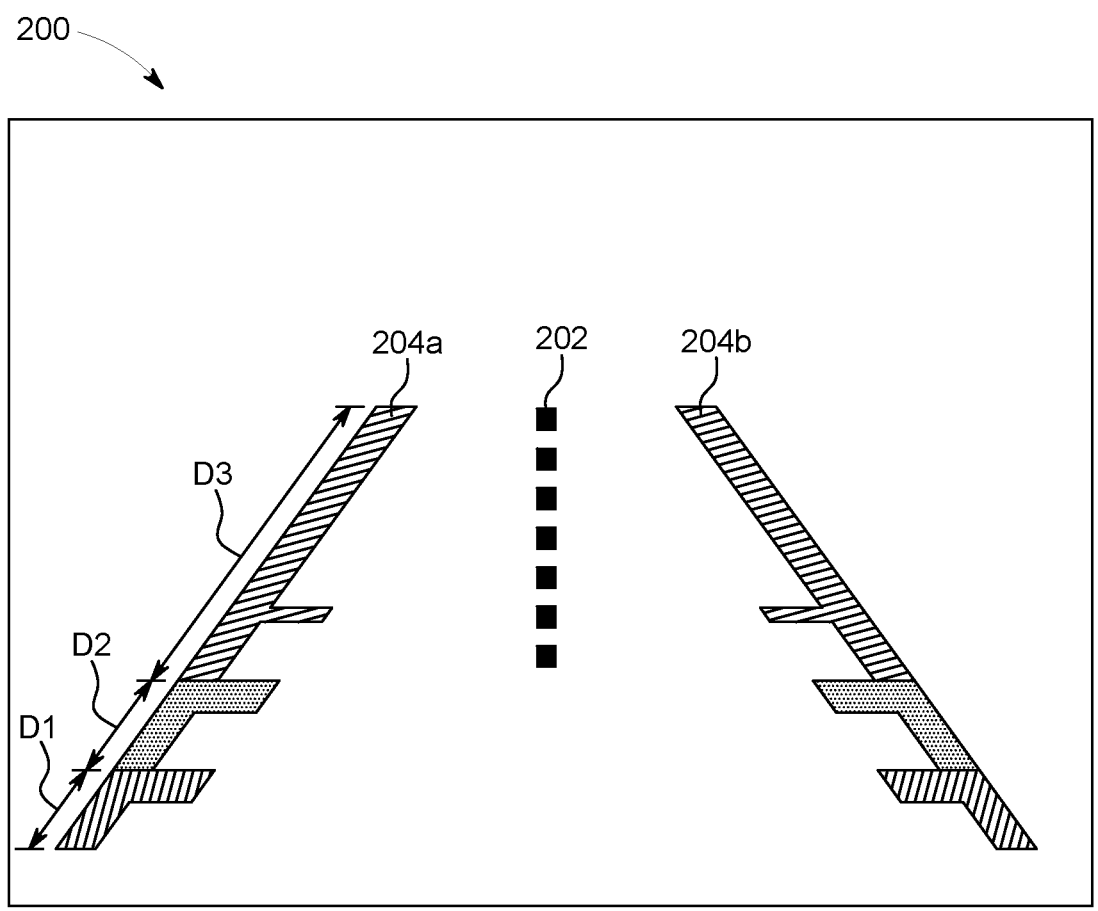
FIG. 2 depicts a first example augmented reality image to facilitate vehicle teleoperation in accordance with the present disclosure.

In some aspects, the system processor 126 may be disposed in communication with one or more memory devices (e.g., the system memory 128 and/or one or more external databases (not shown in FIG. 2). The system memory 128 may be similar to the vehicle memory 110.

In accordance with some aspects, the system memory 128 may store a plurality of information/dataset such as vehicle data or information obtained from the vehicle 102. In some aspects, the system transceiver 124 may be configured to receive the vehicle data or information from the vehicle 102 (e.g., from the vehicle transceiver 112). The system transceiver 124 may receive the vehicle data or information from the vehicle 102 at a predetermined frequency when the teleoperation communication may be established between the vehicle 102 and the computing device 118. The system transceiver 124 may be configured to store the received vehicle data or information in the system memory 128.

The system processor 126 may be configured to obtain the vehicle data or information from the system memory 128 or directly from the system transceiver 124. In some aspects, the system processor 126 may obtain the vehicle data or information responsive to establishing a teleoperation communication with the vehicle 102. The vehicle data or information may include inputs from the vehicle sensors. For example, the vehicle data or information may include images captured by the vehicle camera (such as vehicle front camera or vehicle rear camera), information associated with vehicle steering wheel position or steering rack position or pinion angle, vehicle speed, vehicle change of rate of speed, etc. The system processor 126 may be further configured to estimate a time delay in communication with the vehicle 102. Specifically, the system processor 126 may be configured to estimate a time delay between the vehicle transceiver 112 transmitting the vehicle data or information and the system transceiver 124 receiving the vehicle data or information from the vehicle transceiver 112.

In some aspects, the system processor 126 may use Global Positioning System (GPS) time associated with the vehicle 102 and the computing device 118 to determine the time delay in the communication between the vehicle 102 and the computing device 118. For example, the system processor 126 may add a time stamp (by using the GPS time) when the system processor 126 transmits any information, data, or command to the vehicle 102. The vehicle 102 (e.g., vehicle processor 108) may also add a time stamp on the information or data that the vehicle 102 may transmit to the system processor 126. The system processor 126 may compare the timestamps and determine the time delay in the communication between the vehicle 102 and the computing device 118.

Based on the estimated time delay and the images obtained from the vehicle 102, the system processor 126 may generate an augmented reality image to assist the remote operator 116 to control the vehicle 102 efficiently. Specifically, the system processor 126 may overlay one or more additional information on the images obtained from the vehicle 102 to generate the augmented reality image. The additional information may assist the remote operator 116 to mitigate effects of the time delay and effectively control vehicle operation and movement. The system processor 126 may determine the additional information to overlay on the image (and generate the augmented reality image) based on the estimated time delay and the vehicle data or information obtained from the vehicle 102. The details of the augmented reality image and the overlaid additional information may be understood in conjunction with FIGS. 2 and 3.

Responsive to generating the augmented reality image, the system processor 126 may render the augmented reality image on the user interface associated with the computing device 118. The remote operator 116 may view the augmented reality image and may take control actions to effectively control or manage the vehicle 102 remotely.

In an exemplary embodiment, some or all the above-mentioned steps performed by the system processor 126 may be performed by the vehicle processor 108. Specifically, the vehicle processor 108 may be configured to estimate the time delay in communicating with the system transceiver 124 in the same manner as described above. For example, the vehicle processor 108 may calculate the time delay in receiving commands from the system transceiver 124 and delay to act upon the received commands. Based on the estimated time delay, the vehicle processor 108 may generate an augmented reality image (by using images captured by the vehicle camera), and transmit the augmented reality image to the system transceiver 124 to assist the remote operator 116 to control the vehicle 102 efficiently.

The vehicle 102 and/or the remote operator 116 implement and/or perform operations, as described here in the present disclosure, in accordance with the owner's manual and safety guidelines and regulations.

FIG. 2 depicts a first example augmented reality image 200 to facilitate vehicle teleoperation in accordance with the present disclosure.

In some aspects, the system processor 126 may obtain information associated with vehicle steering wheel position, vehicle steering rack position, a steering motor pinion position/angle, vehicle speed and vehicle change of rate of speed from the vehicle 102 (e.g., via the vehicle transceiver 112, as a part of the vehicle data or information). The system processor 126 may be configured to determine a first predicted vehicle path based on the vehicle steering wheel position, vehicle steering rack position or a steering motor pinion position/angle. The first predicted vehicle path may be indicative of the path that the vehicle 102 may be expected to traverse based on obtained vehicle data (or real-time vehicle data).

Responsive to determining the first predicted vehicle path, the system processor 126 may be configured to generate a first augmented reality image 200 based on the first predicted vehicle path. Specifically, the system processor 126 may overlay the determined first predicted vehicle path on the real-time image (that may be captured by the vehicle front camera, and may be part of the vehicle data or information) obtained from the vehicle 102 or the vehicle transceiver 112 to generate the first augmented reality image 200.

Responsive to generating the first augmented reality image 200, the system processor 126 may render the first augmented reality image 200 on the user interface associated with the computing device 118. The first augmented reality image 200 may provide an indication of vehicle travel to the remote operator 116, so that the remote operator 116 may take the control actions (e.g., braking, stopping, steering, etc.) accordingly.

In some aspects, the first augmented reality image 200 generated by the system processor 126 may include a center line 202 that may indicate a predicted vehicle path (e.g., forward predicted vehicle path) based on the vehicle steering wheel position, and side lines 204a and 204b that may indicate vehicle clearance on both sides (e.g., left and right sides) of the vehicle 102. In an exemplary aspect, the center line 202 may be a dotted line and the side lines 204a and 204b may be solid lines.

In further aspects, the system processor 126 may be configured to derive or determine a stopping distance range ahead of the vehicle 102 or in proximity to a vehicle front portion, based on the vehicle data or information obtained from the vehicle 102 and the estimated time delay in communication between the vehicle 102 and the computing device 118 (as described above in conjunction with FIG. 1). Specifically, the system processor 126 may derive the stopping distance range based on the vehicle speed, the rate of change of vehicle speed, road slope, and the estimated time delay. In some aspects, the system processor 126 may derive the stopping distance range as a function of rate of change (decreasing) of vehicle speed, actual current vehicle velocity/speed, and the estimated time delay, as depicted in an exemplary expression below.

$$Db = \frac{1}{2} * a * (Vo/a)^2 + Vo * td$$

In the expression above, Db is braking/stopping distance; a is rate of change (decreasing) of vehicle speed; Vo is the actual current vehicle velocity and td is the estimated time delay.

Exemplary stopping distance range is shown in FIG. 2 as a first distance range "D1", a second distance range "D2" and a third distance range "D3". Responsive to determining the stopping distance range, the system processor 126 may overlay the stopping distance range on the first augmented reality image 200 or may add information associated with the stopping distance range in the first augmented reality image 200. The stopping distance range may provide an indication of depth to the remote operator 116 when the remote operator 116 controls the vehicle 102. For example, the stopping distance range may provide an indication of a distance between the vehicle 102 and an obstacle in front of the vehicle 102. The obstacle may include another vehicle, a pedestrian, or any other object. As would be appreciated, since the vehicle 102 may be moving with steady, increasing or decreasing speed, the system processor 126 may derive/determine the stopping distance range dynamically.

In some aspects, the first distance range "D1" may indicate a minimum stopping distance at maximum braking, the second distance range "D2" may indicate a minimum stopping distance at an uncomfortable abrupt braking and the third distance range "D3" may indicate a nominal stopping distance for comfortable braking. In an exemplary aspect, the maximum braking may be in range of 0.5-1 [g], abrupt braking may be in range of 0.1-0.5 [g], and comfortable braking may be in range of up to 0.1 [g].

As described above, the system processor 126 may generate the first augmented reality image 200 based on or by overlaying the stopping distance range. The system processor 126 may then render the first augmented reality image 200 (with the stopping distance range) on the user interface. The system processor 126 may render all the distance ranges (such as the first distance range "D1", a second distance range "D2", and a third distance range "D3") simultaneously along the side lines 204a and 204b on the user interface to provide sense of depth to the remote operator 116, who may accordingly take control actions. In some aspects, the system processor 126 may display the first distance range "D1", the second distance range "D2" and the third distance range "D3" in different colors on the first augmented reality image 200 to represent different distance ranges. In further aspects, the system processor 126 may display a series of gradations or gradients along the side lines 204a and 204b to represent the different distance ranges.

Although the description above describes an aspect where the system processor 126 obtains the information from the vehicle 102, determines the first predicted vehicle path, and generates the first augmented reality image 200, in some aspects, the vehicle processor 108 may determine the first predicted vehicle path (in the same manner as described above) and generate the first augmented reality image 200. Responsive to generating the first augmented reality image 200, the vehicle processor 108 may transmit the first augmented reality image 200 to the system processor 126.

In addition, although the description above describes an aspect where the system processor 126 renders the first augmented reality image 200 on the user interface, in some aspects, the system processor 126 may overlay further or additional information on the first augmented reality image 200 before rendering the first augmented reality image 200 on the user interface. An exemplary aspect of additional information being overlaid on the first augmented reality image 200 is depicted in FIG. 3 and described below.

Figure 3:
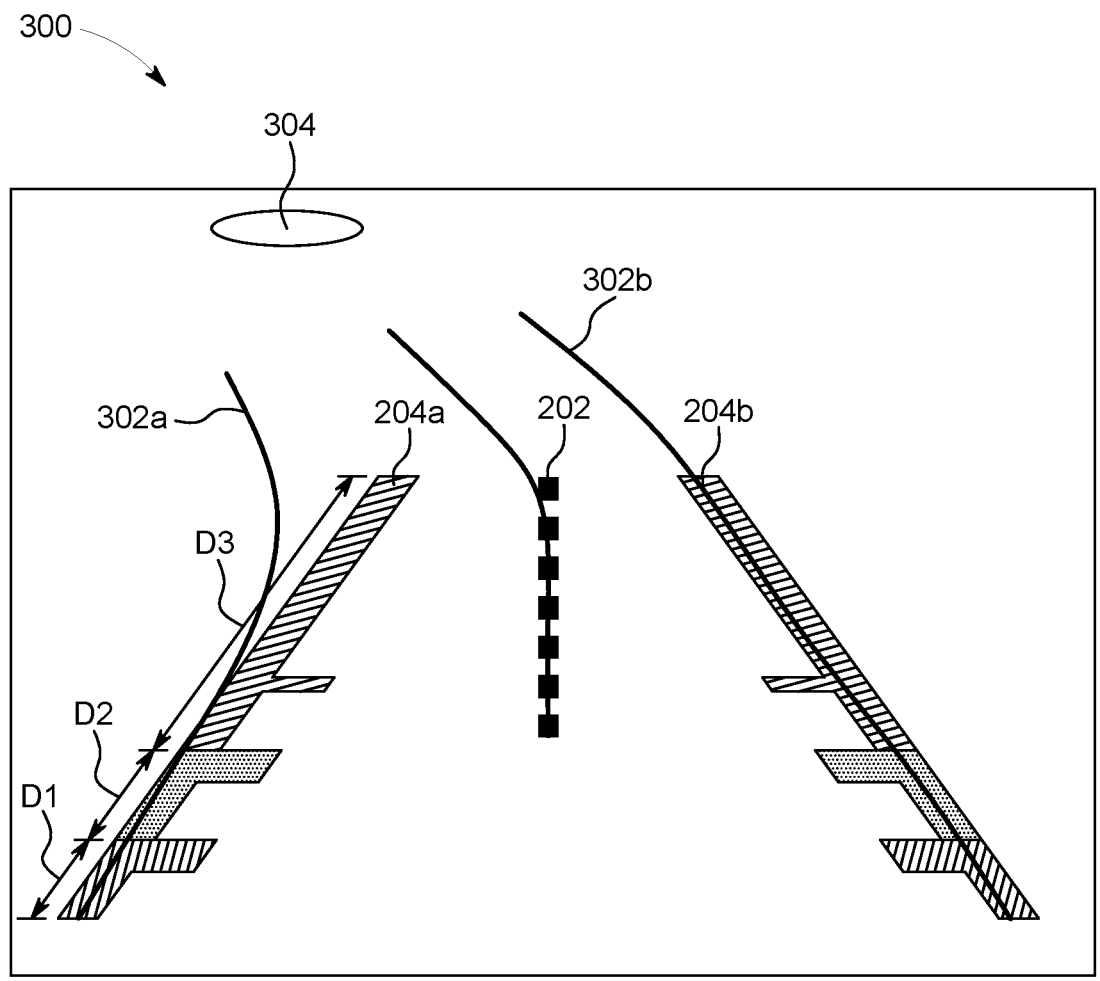
FIG. 3 depicts a second example augmented reality image to facilitate vehicle teleoperation in accordance with the present disclosure.

FIG. 3 depicts a second example augmented reality image 300 to facilitate vehicle teleoperation in accordance with the present disclosure. The second augmented reality image 300 may be similar to the first augmented reality image 200; however, the system processor 126 may add or overlay additional information on the first augmented reality image 200 to generate the second augmented reality image 300. The second augmented reality image 300 may further assist the remote operator 116 in efficiently controlling/managing vehicle operation and movement.

In some aspects, the system processor 126 may be configured to obtain a remote steering wheel angle when the remote operator 116 steers the remote steering wheel 120. In further aspects, the system processor 126 may obtain information associated with joystick rotation when the remote operator 116 uses a joystick for steering. In some aspects, the system processor 126 may obtain the remote steering command from an input device (such as the remote steering wheel 120 or the joystick) such as wheel angle from a steering wheel sensor (not shown) that may be disposed on the remote steering wheel 120 or the joystick. Responsive to obtaining the remote steering command, the system processor 126 may determine a second predicted vehicle path based on the remote steering command. The second predicted vehicle path may indicate a path that the vehicle 102 may be expected to traverse based on the teleoperation commands transmitted by the computing device 118 to the vehicle 102.

Responsive to determining the second predicted vehicle path, the system processor 126 may overlay the second predicted vehicle on the first augmented reality image 200 to generate the second augmented reality image 300 based on the second predicted vehicle path. Stated another way, the system processor 126 may overlay the first predicted vehicle path, the second predicted vehicle path, and the stopping distance range simultaneously on the image to generate the second augmented reality image 300. The system processor 126 may then render the second augmented reality image 300 on the user interface associated with the computing device 118. The augmented reality image 300 may provide an indication of predicted vehicle path to the remote operator 116, so that the remote operator 116 may accordingly take control actions (e.g., braking, etc.).

The augmented reality image 300 may include curved lines 302a and 302b to indicate the second predicted vehicle path based on the remote steering command. The curved lines 302a and 302b may provide real time indication to the remote operator 116 of the predicted vehicle path based on the remote operator inputs or commands (e.g., using the input device, e.g., remote steering wheel 120 or the joystick). The curved lines 302a and 302b facilitate the remote operator 116 to efficiently control the vehicle 102 even when there may be a time delay in communicating with the vehicle 102.

In some aspects, the curved lines 302a and 302b may be displayed in addition to the center line 202 and the side lines 204a and 204b described above in conjunction with FIG. 2. The center line 202 and the side lines 204a and 204b may indicate the predicted vehicle path based on the vehicle steering wheel/joystick position (e.g., based on "previous" steering inputs that the remote operator 116 may have transmitted to the vehicle 102), and the curved lines 302a and 302b may indicate the real-time predicted vehicle path based on "current" remote steering wheel angle (e.g., based on current steering wheel inputs obtained from the remote steering wheel 120) or joystick position.

In further aspects, the system processor 126 may be configured to determine a target object position for a target object 304 (e.g., a virtual object) for the remote operator 116 to "focus" on the second augmented reality image 300, which may facilitate the remote operator 116 to manage vehicle movement effectively. The target object 304 may indicate a visual "look-ahead" target position for the remote operator 116. The target object 304 may be of any shape and dimension. In an exemplary aspect depicted in FIG. 3, the target object 304 may be oval-shaped.

The system processor 126 may determine the target object 304 position as a function of vehicle speed, rate of change of vehicle speed and the estimated time delay, and generate the second augmented reality image 300 based on the target object 304 position (i.e., overlay the target object 304) on the image to generate the second augmented reality image 300 along with the center line 202, the side lines 204a, 204b, and the curved lines 302a, 302b. For example, the system processor 126 may position the target object 304 farther (e.g., from the first distance "D1" or a vehicle current position in the second augmented reality image 300) when the vehicle speed may be increasing or when the time delay may be increasing or greater than a predefined threshold. Further, the system processor 126 may diminish or reduce target object 304 size with increasing vehicle speed and/or time delay, thereby making the target object 304 appear farther ahead or away on the second augmented reality image 300. Similarly, the system processor 126 may position the target object 304 closer when the vehicle speed and/or the time delay may be decreasing.

In further aspects, the system processor 126 may determine the target object 304 position based on the remote steering wheel/joystick position/angle. For example, the system processor 126 may determine lateral position of the target object 304 on the second augmented reality image 300 based on the remote steering wheel/joystick position/angle.

Responsive to determining the target object 304 position, the system processor 126 may overlay the target object 304 on the second augmented reality image 300, and render the second augmented reality image 300 on the user interface. The target object 304 facilitates the remote operator 116 to manage the vehicle 102 effectively by "focusing" on the target object 304. For example, if an obstacle (such as another vehicle, a pedestrian, or an object) is in the target object 304, the remote operator 116 may take control action, e.g., apply brakes, thereby preventing adverse scenarios.

A person ordinarily skilled in the art may appreciate that the system processor 126 positions the target object 304 farther away in the second augmented reality image 300 when the vehicle speed or the time delay may be increasing so that if an obstacle is located near the target object 304, the remote operator 116 may have ample time to take remedial control actions. Therefore, the target object 304 acts as "lead" information which is generated and rendered on the user interface to compensate for the estimated time delay.

In further aspects, the system processor 126 may be configured to provide audio feedback or haptic feedback via one or more system components to indicate the time delay or obstacle presence, in addition to providing visual indication (e.g., via the augmented reality image).

In an alternative embodiment, the vehicle processor 108 may obtain the remote steering command from the system transceiver 124 and may determine the second predicted vehicle path based on the remote steering command in the manner described above. The vehicle processor 108 may generate the second augmented reality image 300 based on the second predicted vehicle path and transmit the second augmented reality image 300 to the system transceiver 124.

Figure 4:
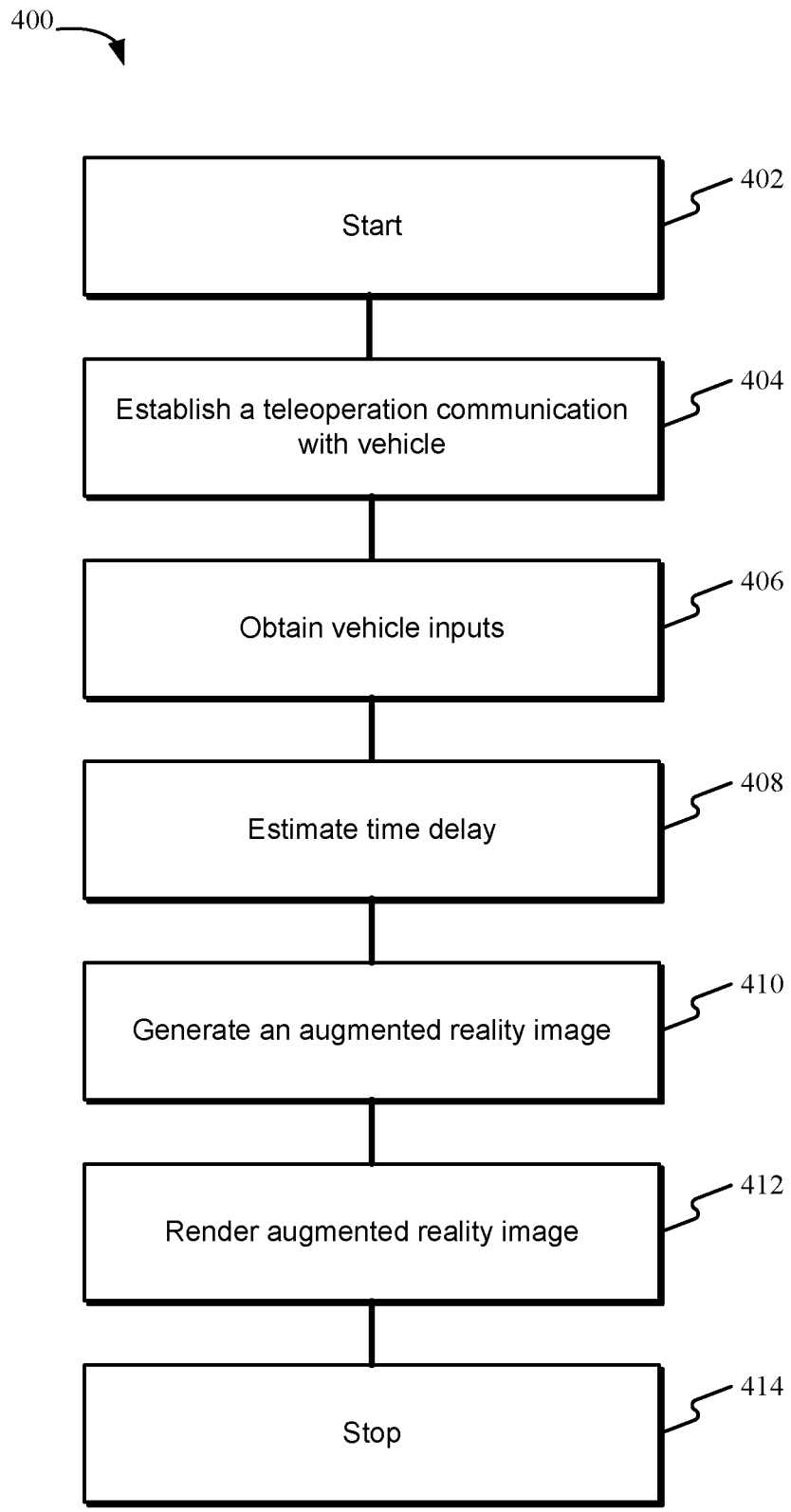
FIG. 4 depicts a flow diagram of an example method to manage a vehicle in accordance with the present disclosure.

FIG. 4 depicts a flow diagram of an example method 400 to manage a vehicle in accordance with the present disclosure. FIG. 4 may be described with continued reference to prior figures, including FIGS. 1-3. The following process is exemplary and not confined to the steps described hereafter. Moreover, alternative embodiments may include more or less steps that are shown or described herein and may include these steps in a different order than the order described in the following example embodiments.

The method 400 may start at step 402. At step 404, the method 400 may include establishing, by the system processor 126, a teleoperation communication with the vehicle 102. At step 406, the method 400 may include obtaining, by the system processor 126, vehicle inputs responsive to establishing the teleoperation communication. The vehicle inputs may be associated with the vehicle 102 and may include image(s) captured by vehicle cameras, vehicle speed, vehicle steering wheel angle/position, steering rack position or pinion angle, and/or the like.

At step 408, the method 400 may include estimating (or determining), by the system processor 126, a time delay in communicating with the vehicle 102. The system processor 126 may estimate the time delay by using GPS time, as described above in conjunction with FIG. 2.

At step 410, the method 400 may include generating, by the system processor 126, an augmented reality image based on the time delay (estimated at step 408) and the image (obtained at step 406). Specifically, the system processor 126 may generate the augmented reality image by overlaying content (such as the center line 202, the side lines 204a, 204b, the curved lines 302a, 302b and the target object 304) on the image. At step 412, the method 400 may include rendering, by the system processor 126, the augmented reality image on a user interface to enable the remote operator 116 to effectively manage the vehicle 102. At step 414, the method 400 may stop.

A person ordinarily skilled in the art may appreciate that the steps 406, 408, 410, and 412 may be repeatedly performed till the remote teleoperation unit 104 and the vehicle 102 are no longer engaged in teleoperation communication. Also, as described above, all the above-mentioned steps may be performed by the vehicle processor 108 and are not limited to being performed by the system processor 126.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method to manage a vehicle, the method comprising:
obtaining, by a processor of a vehicle teleoperation system, an image captured by a vehicle camera, a vehicle steering rack position, a steering motor pinion position/angle, a steering wheel position, a vehicle speed, and a vehicle rate of change of speed;
estimating, by the processor and based on the image, the vehicle steering rack position, the steering motion pinion position/angle, the steering wheel position, the vehicle speed, and the vehicle rate of change of speed, a time delay in teleoperation communication with the vehicle;
determining a stopping distance range in proximity to a vehicle front portion based on the vehicle speed, the vehicle rate of change of speed, and the time delay;
generating and displaying, by the processor, an augmented reality image based on the time delay and the vehicle steering rack position, the steering motion pinion position/angle, the steering wheel position, the vehicle speed, and the vehicle rate of change of speed;
determining a first predicted path of the vehicle based on the vehicle steering rack position, the steering motor pinion position/angle, and the steering wheel position;
overlaying, in the augmented reality image, the stopping distance range over the first predicted vehicle path of travel to generate a modified augment reality image; and
rendering, by the processor, the modified augmented reality image on a user interface of the vehicle teleoperation system, the modified augmented reality image including a first line corresponding to the first predicted path and a second line corresponding to the stopping distance range, wherein the vehicle is controlled by the processor.

2. The method of claim 1, wherein the stopping distance range comprises a first distance range, a second distance range, and a third distance range, and wherein each of the first distance range, the second distance range, and the third distance range is displayed in the modified augmented reality image by a predetermined color or gradient.

3. The method of claim 1, wherein the modified augment reality image includes a third line corresponding to the stopping distance range.

4. The method of claim 3, wherein the second line and the third line are disposed on either side of the first line.

5. The method of claim 1 further comprising:
obtaining an operator terminal steering command from an input device, wherein the input device comprises a steering wheel or joystick;
determining a second predicted vehicle path of travel based on the operator terminal steering command; and
overlaying the second predicted vehicle path on the modified augmented reality image.

6. The method of claim 5 further comprising:
determining a target object position for a target object on the image for a vehicle operator to focus and manage the vehicle, wherein the determination of the target object position is based on the vehicle steering rack position, the steering motion pinion position/angle, the steering wheel position, the vehicle speed, and the vehicle rate of change of speed, the operator terminal steering command, and the time delay; and overlaying the target object on the modified augmented reality image based on the target object position.

7. The method of claim 6, wherein a target object size depends on the vehicle speed and the time delay.

8. The method of claim 6 further comprising overlaying the first predicted vehicle path, stopping distance range, the second predicted vehicle path, and the target object simultaneously on the image to generate the augmented reality image.

9. A system to manage a vehicle, the system comprising:
a processor;
a memory operably coupled to the system and storing instructions for execution on the processor, the instructions causing the processor to:
  obtain vehicle inputs comprising: an image captured by a vehicle camera, a vehicle steering rack position, a steering motor pinion position/angle, a steering wheel position, a vehicle speed, and a vehicle rate of change of speed;
  estimate, based on the vehicle inputs, a time delay in teleoperation communication with the vehicle;
  determine a stopping distance range in proximity to a vehicle front portion based on the vehicle speed, the vehicle rate of change of speed, and the time delay;
  determine a first predicted path of the vehicle based on the vehicle steering rack position, the steering motor pinion position/angle, and the steering wheel position;
  generate an augmented reality image based on the time delay, the stopping distance, the first predicted path, and the vehicle inputs;
  and
  render the augmented reality image on a user interface to manage the vehicle, the augment reality image displaying a first line corresponding to the first predicted path and a second line corresponding to the stopping distance range.

10. The system of claim 9, wherein the stopping distance range comprises a first distance range, a second distance range, and a third distance range, and wherein each of the first distance range, the second distance range, and the third distance range is displayed on the augmented reality image by a predetermined color or gradient.

11. The system of claim 9, wherein the augment reality image includes a third line corresponding to the stopping distance range.

12. The system of claim 11, wherein the second line and the third line are disposed on either side of the first line.

13. The system of claim 9, wherein the processor is further configured to:

obtain an operator terminal steering command from an input device, wherein the input device comprises a steering wheel or joystick;
determine a second predicted vehicle path of travel based on the operator terminal steering command; and
overlay the second predicted vehicle path on the image to generate the augmented reality image.

14. The system of claim 13, wherein the processor is further configured to:
determine a target object position for a target object on the image for a vehicle operator to focus and manage the vehicle, wherein the determination of the target object position is based on the vehicle inputs, the operator terminal steering command, and the time delay; and
display the target object in the augmented reality image based on the target object position.

15. The system of claim 14, wherein a target object size depends on the vehicle speed and the time delay.

16. A non-transitory computer-readable storage medium having instructions stored thereupon which, when executed by a processor, cause the processor to:
obtain vehicle inputs comprising: an image captured by a vehicle camera, a vehicle steering rack position, a steering motor pinion position/angle, a steering wheel position, a vehicle speed, and a vehicle rate of change of speed;
estimate, based on the vehicle inputs, a time delay in teleoperation communication with a vehicle;
determine a stopping distance range in proximity to a vehicle front portion based on the vehicle speed, the vehicle rate of change of speed, and the time delay;
determine a first predicted path of the vehicle based on the vehicle steering rack position, the steering motor pinion position/angle, and the steering wheel position;
generate an augmented reality image based on the time delay, the stopping distance, the first predicted path, and the vehicle inputs; and
render the augmented reality image on a user interface to manage the vehicle, the augment reality image displaying a first line corresponding to the first predicted path and a second line corresponding to the stopping distance range.

17. The non-transitory computer-readable storage medium of claim 16, wherein the augment reality image includes a third line corresponding to the stopping distance range.

18. The non-transitory computer-readable storage medium of claim 17, wherein the second line and the third line are disposed on either side of the first line.

* * * * *